(12) United States Patent
Eguchi

(10) Patent No.: US 6,885,507 B2
(45) Date of Patent: Apr. 26, 2005

(54) ZOOM LENS SYSTEM WHICH COVERS A WIDE ANGLE RANGE

(75) Inventor: Masaru Eguchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 38 days.

(21) Appl. No.: 10/414,103

(22) Filed: Apr. 16, 2003

(65) Prior Publication Data

US 2003/0197948 A1 Oct. 23, 2003

(30) Foreign Application Priority Data

Apr. 19, 2002 (JP) ........................... 2002-118068

(51) Int. Cl.$^7$ ............................................. G02B 15/14
(52) U.S. Cl. ....................................... 359/689; 359/683
(58) Field of Search .................................. 359/683, 689

(56) References Cited

U.S. PATENT DOCUMENTS

| | | | |
|---|---|---|---|
| 4,978,204 A | 12/1990 | Ito | |
| 5,455,714 A | 10/1995 | Kohno | |
| 6,324,017 B1 | 11/2001 | Enomoto | |
| 6,353,507 B1 | 3/2002 | Enomoto | |
| 6,369,955 B1 | 4/2002 | Enomoto et al. | |
| 6,560,035 B2 | 5/2003 | Enomoto | |

FOREIGN PATENT DOCUMENTS

| | | |
|---|---|---|
| JP | 5-93865 | 4/1993 |
| JP | 6-82697 | 3/1994 |
| JP | 2002221661 | 8/2002 |

OTHER PUBLICATIONS

English Language Abstracts of JP Appl. No. 6–82697.

*Primary Examiner*—Scott J. Sugarman
(74) *Attorney, Agent, or Firm*—Greenblum & Bernstein, P.L.C.

(57) ABSTRACT

A zoom lens system, covering a wide-angle range, includes a negative first lens group, a positive second lens group, and a negative third lens group. Zooming is performed by varying the distances between the first to third lens groups, and the zoom lens system satisfies the following conditions:

$$1.9 < |(fw*ft)^{1/2}/f1| < 2.9 \, (f1<0) \quad (1)$$

$$1.0 < f12t/f12w < 1.8 \quad (2)$$

wherein fw and ft designate the focal length of the entire zoom lens system, respectively, at the short focal length extremity and the long focal length extremity;

f1 designates the focal length of the negative first lens group;

f12w and f12t designate the combined focal length of the negative first lens group and the positive second lens group, respectively, at the short focal length extremity and the long focal length extremity.

6 Claims, 18 Drawing Sheets

Fig. 1
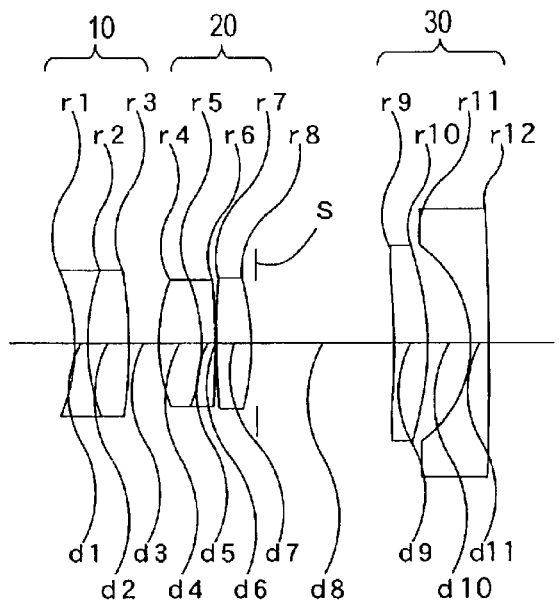
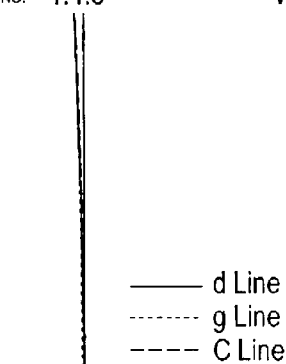
Fig. 2A
F_{NO.}= 1:4.8
— d Line
······ g Line
---- C Line
-1.5   1.5
SPHERICAL
ABERRATION
CHROMATIC
ABERRATION
Fig. 2B
W=42.0°
-0.1   0.1
LATERAL
CHROMATIC
ABERRATION
Fig. 2C
W=42.0°
— S
-- M
-1   1
ASTIGMATISM
Fig. 2D
W=42.0°
-5 (%) 5
DISTORTION

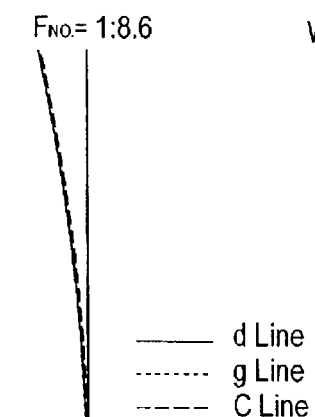
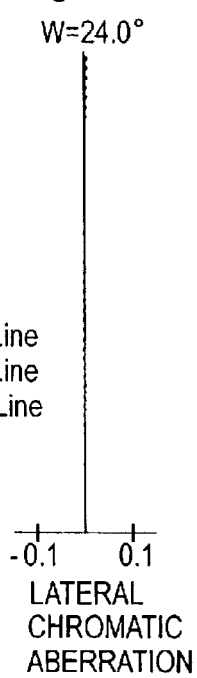
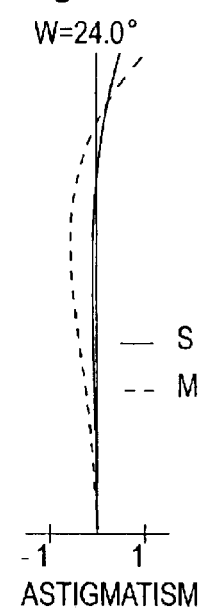
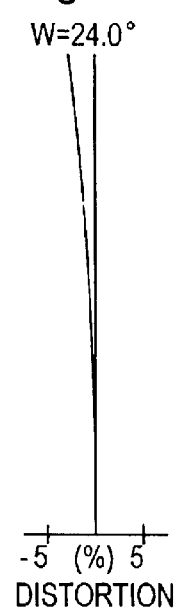
Fig. 3A  F$_{NO.}$= 1:8.6  SPHERICAL ABERRATION CHROMATIC ABERRATION
Fig. 3B  W=24.0°  LATERAL CHROMATIC ABERRATION
Fig. 3C  W=24.0°  ASTIGMATISM
Fig. 3D  W=24.0°  DISTORTION
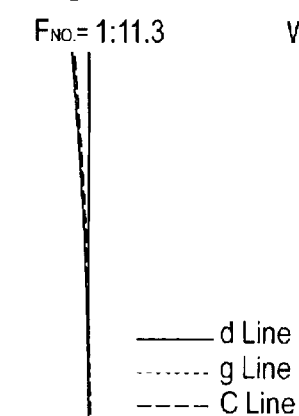
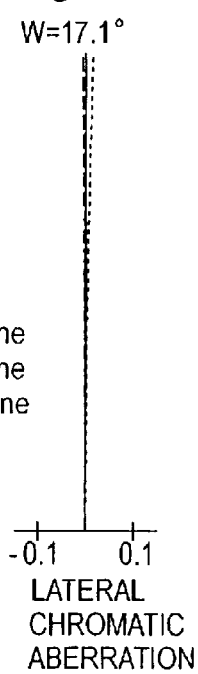
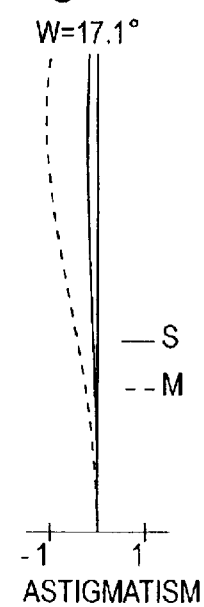
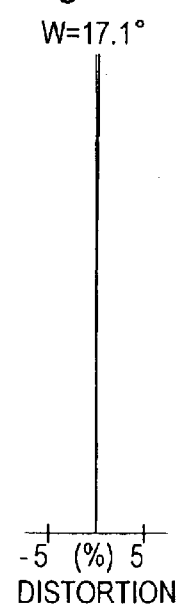
Fig. 4A  F$_{NO.}$= 1:11.3  SPHERICAL ABERRATION CHROMATIC ABERRATION
Fig. 4B  W=17.1°  LATERAL CHROMATIC ABERRATION
Fig. 4C  W=17.1°  ASTIGMATISM
Fig. 4D  W=17.1°  DISTORTION Fig. 5
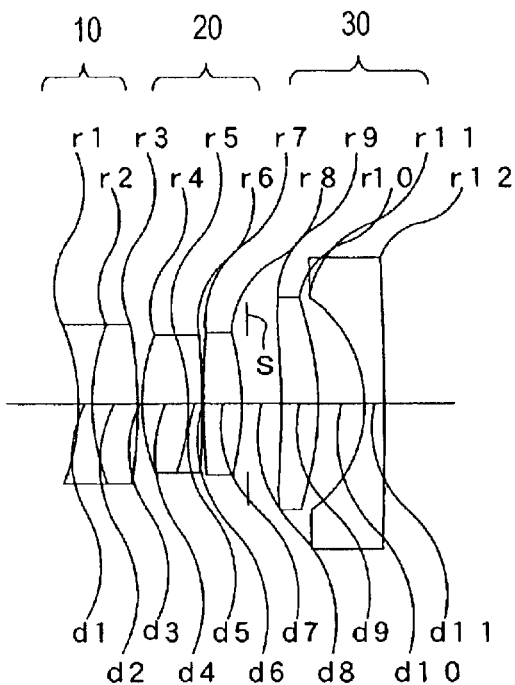
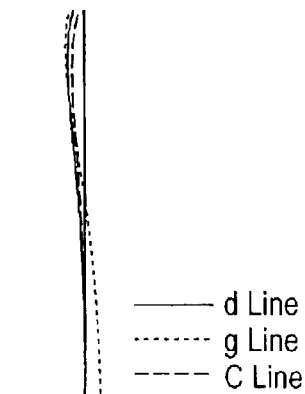
Fig. 6A
F_NO.=1:13.0
— d Line
······ g Line
--- C Line
-1.5   1.5
SPHERICAL
ABERRATION
CHROMATIC
ABERRATION
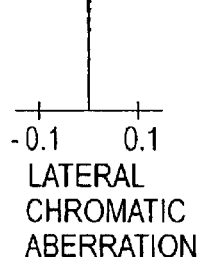
Fig. 6B
W=12.6°
-0.1   0.1
LATERAL
CHROMATIC
ABERRATION
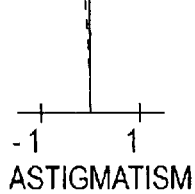
Fig. 6C
W=12.6°
— S
-- M
-1   1
ASTIGMATISM
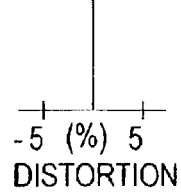
Fig. 6D
W=12.6°
-5 (%) 5
DISTORTION F_{No.}= 1:5.3

—— d Line
······· g Line
--- C Line

-1.5  1.5
SPHERICAL
ABERRATION

CHROMATIC
ABERRATION

W=41.8°

-0.1  0.1
LATERAL
CHROMATIC
ABERRATION

W=41.8°

—— S
-- M

-1  1
ASTIGMATISM

W=41.8°

-5 (%) 5
DISTORTION

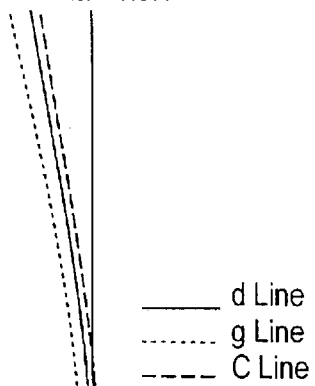

Fig. 11
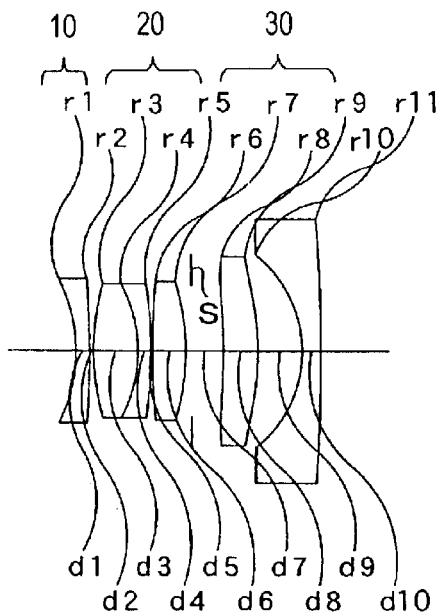
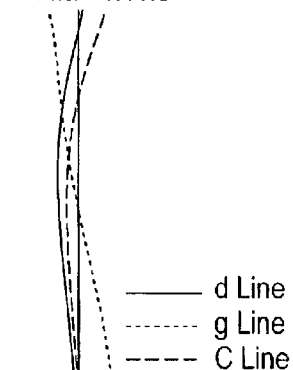
Fig. 12A
F$_{NO.}$= 1:11.8
Fig. 12B
W=12.5°
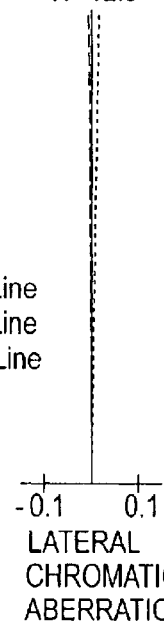
Fig. 12C
W=12.5°
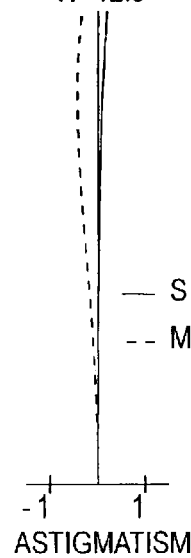
Fig. 12D
W=12.5°
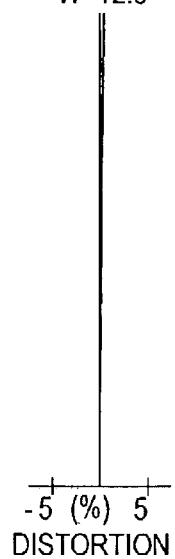
—— d Line
······· g Line
---- C Line
—— S
-- M
-1.5   1.5
SPHERICAL
ABERRATION
CHROMATIC
ABERRATION
-0.1   0.1
LATERAL
CHROMATIC
ABERRATION
-1   1
ASTIGMATISM
-5 (%) 5
DISTORTION

F_{NO.}= 1:5.4

—— d Line
········ g Line
---- C Line

-1.5   1.5
SPHERICAL
ABERRATION

CHROMATIC
ABERRATION

W=42.2°

-0.1   0.1
LATERAL
CHROMATIC
ABERRATION

W=42.2°

—— S
-- M

-1   1
ASTIGMATISM

W=42.2°

-5  (%)  5
DISTORTION

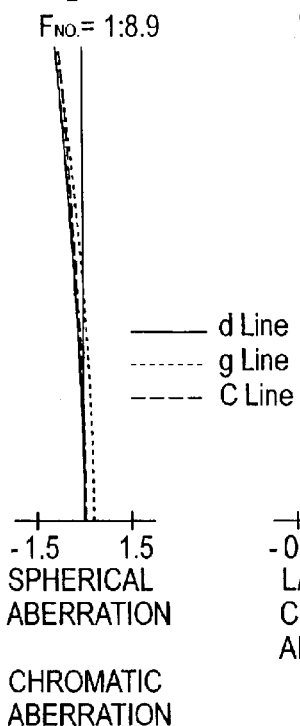
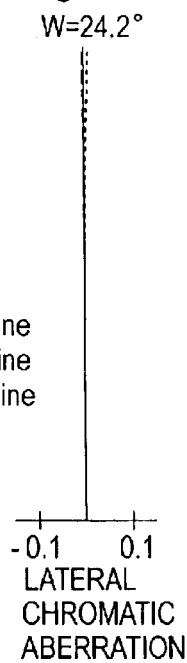
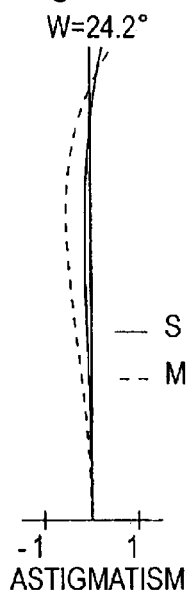
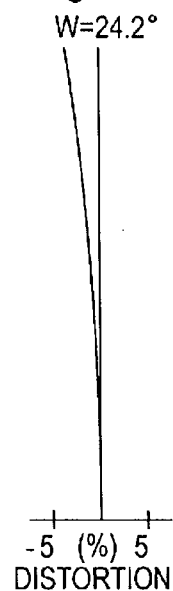
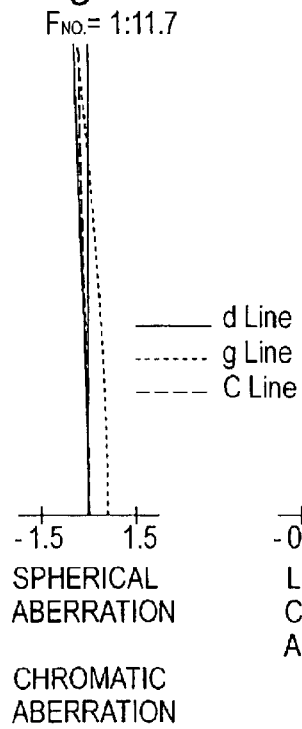
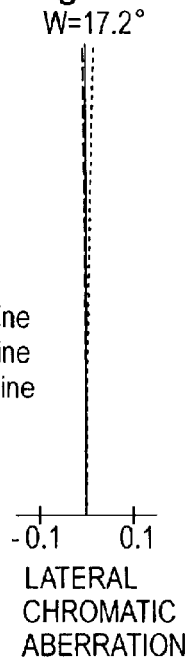
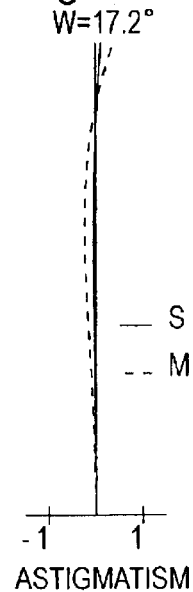
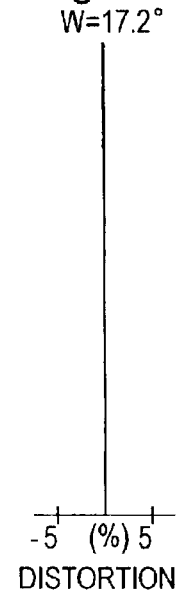

F_{NO.}= 1:12.7

── d Line
······ g Line
---- C Line

-1.5  1.5
SPHERICAL
ABERRATION

CHROMATIC
ABERRATION

W=12.6°

-0.1  0.1
LATERAL
CHROMATIC
ABERRATION

W=12.6°

── S
-- M

-1  1
ASTIGMATISM

W=12.6°

-5 (%) 5
DISTORTION

Fig. 19
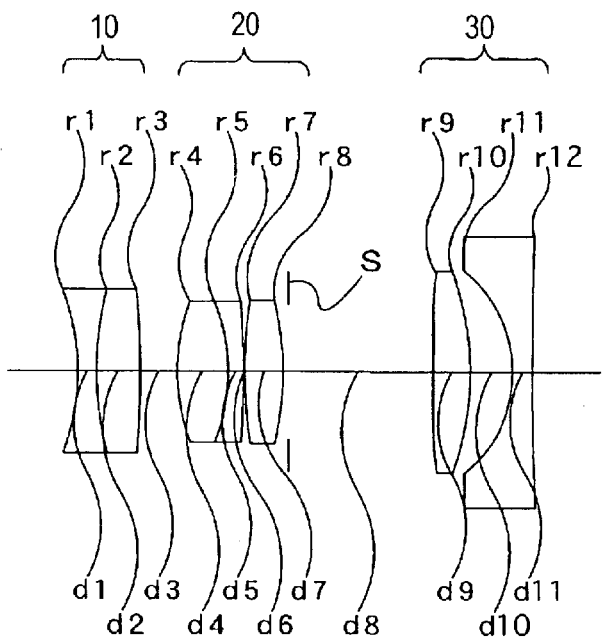
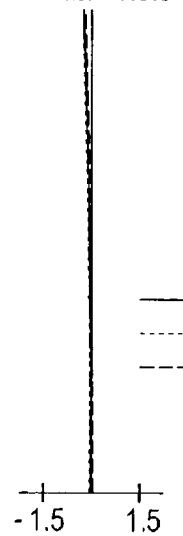
Fig. 20A
F_NO.= 1:5.0
—— d Line
------ g Line
---- C Line
-1.5  1.5
SPHERICAL
ABERRATION
CHROMATIC
ABERRATION
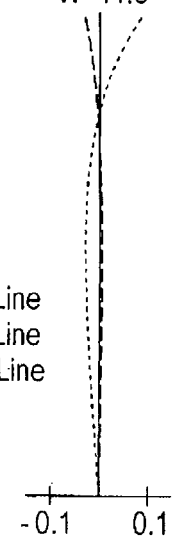
Fig. 20B
W=41.8°
-0.1  0.1
LATERAL
CHROMATIC
ABERRATION
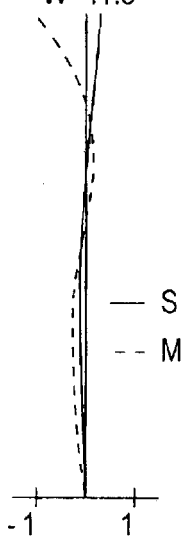
Fig. 20C
W=41.8°
—— S
-- M
-1  1
ASTIGMATISM
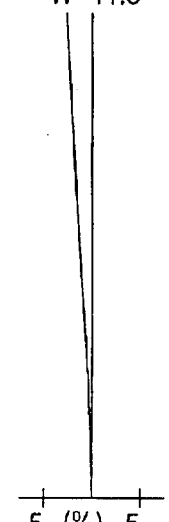
Fig. 20D
W=41.8°
-5 (%) 5
DISTORTION

F_{NO.}= 1:8.7

W=24.1°

W=24.1°

W=24.1°

—— d Line
········ g Line
---- C Line

—— S
-- M

-1.5  1.5
SPHERICAL
ABERRATION

CHROMATIC
ABERRATION

-0.1  0.1
LATERAL
CHROMATIC
ABERRATION

-1  1
ASTIGMATISM

-5 (%) 5
DISTORTION

F_{NO.}= 1:11.3

W=17.1°

W=17.1°

W=17.1°

—— d Line
········ g Line
---- C Line

—— S
-- M

-1.5  1.5
SPHERICAL
ABERRATION

CHROMATIC
ABERRATION

-0.1  0.1
LATERAL
CHROMATIC
ABERRATION

-1  1
ASTIGMATISM

-5 (%) 5
DISTORTION

F_NO = 1:13.5

— d Line
······ g Line
--- C Line

-1.5    1.5
SPHERICAL
ABERRATION

CHROMATIC
ABERRATION

W=11.5°

-0.1    0.1
LATERAL
CHROMATIC
ABERRATION

W=11.5°

— S
--- M

-1    1
ASTIGMATISM

W=11.5°

-5 (%)  5
DISTORTION

F_{NO.}= 1:5.0

—— d Line
········ g Line
- - - - C Line

-1.5   1.5
SPHERICAL
ABERRATION

CHROMATIC
ABERRATION

W=41.5°

-0.1   0.1
LATERAL
CHROMATIC
ABERRATION

W=41.5°

—— S
- - M

-1    1
ASTIGMATISM

W=41.5°

-5  (%)  5
DISTORTION

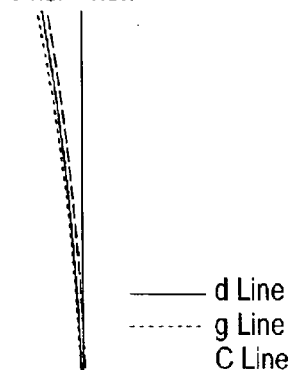
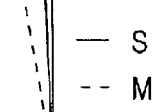
Fig. 27A
F_NO.= 1:8.7
Fig. 27B
W=24.0°
Fig. 27C
W=24.0°
Fig. 27D
W=24.0°
— d Line
······ g Line
--- C Line
— S
-- M
-1.5  1.5
SPHERICAL
ABERRATION
CHROMATIC
ABERRATION
-0.1  0.1
LATERAL
CHROMATIC
ABERRATION
-1  1
ASTIGMATISM
-5 (%) 5
DISTORTION
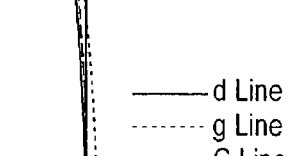
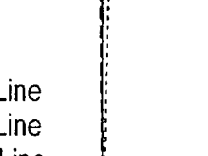
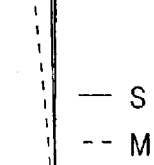
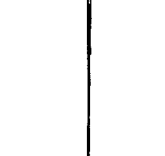
Fig. 28A
F_NO.= 1:11.4
Fig. 28B
W=17.1°
Fig. 28C
W=17.1°
Fig. 28D
W=17.1°
— d Line
······ g Line
--- C Line
— S
-- M
-1.5  1.5
SPHERICAL
ABERRATION
CHROMATIC
ABERRATION
-0.1  0.1
LATERAL
CHROMATIC
ABERRATION
-1  1
ASTIGMATISM
-5 (%) 5
DISTORTION Fno.= 1:13.6

—— d Line
······· g Line
- - - C Line

-1.5  1.5
SPHERICAL
ABERRATION

CHROMATIC
ABERRATION

W=11.5°

-0.1  0.1
LATERAL
CHROMATIC
ABERRATION

W=11.5°

—— S
- - M

-1  1
ASTIGMATISM

W=11.5°

-5 (%) 5
DISTORTION

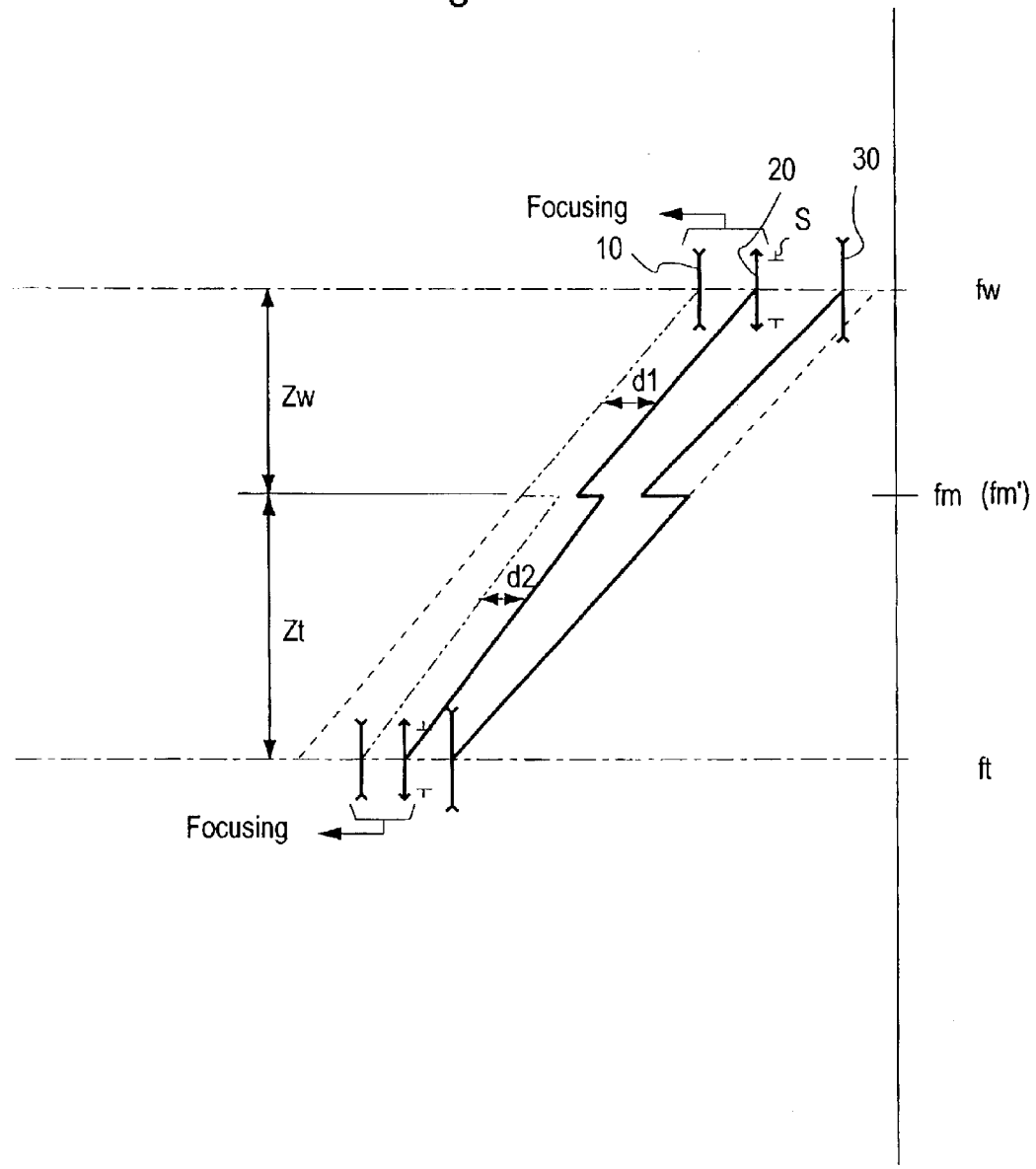

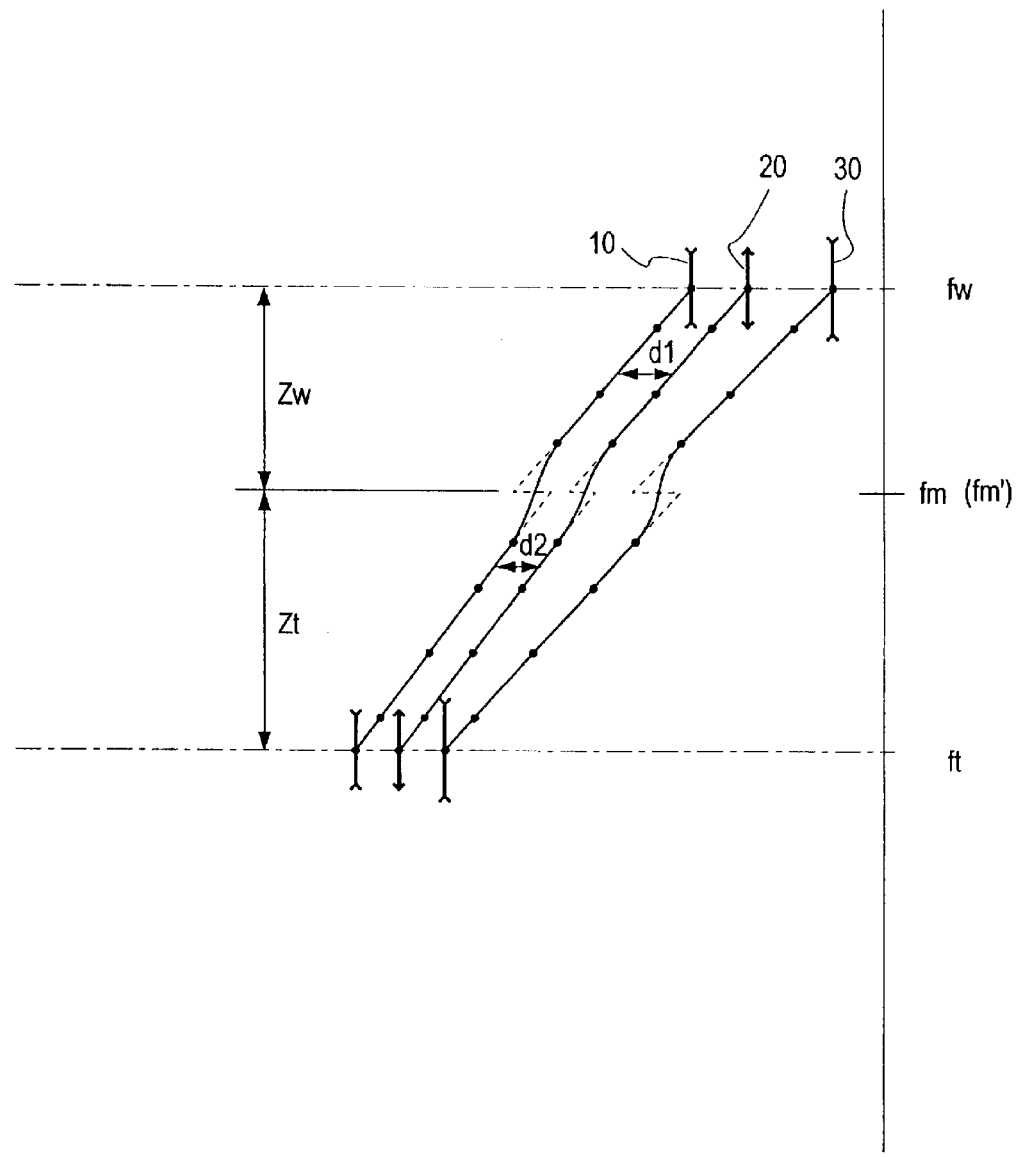

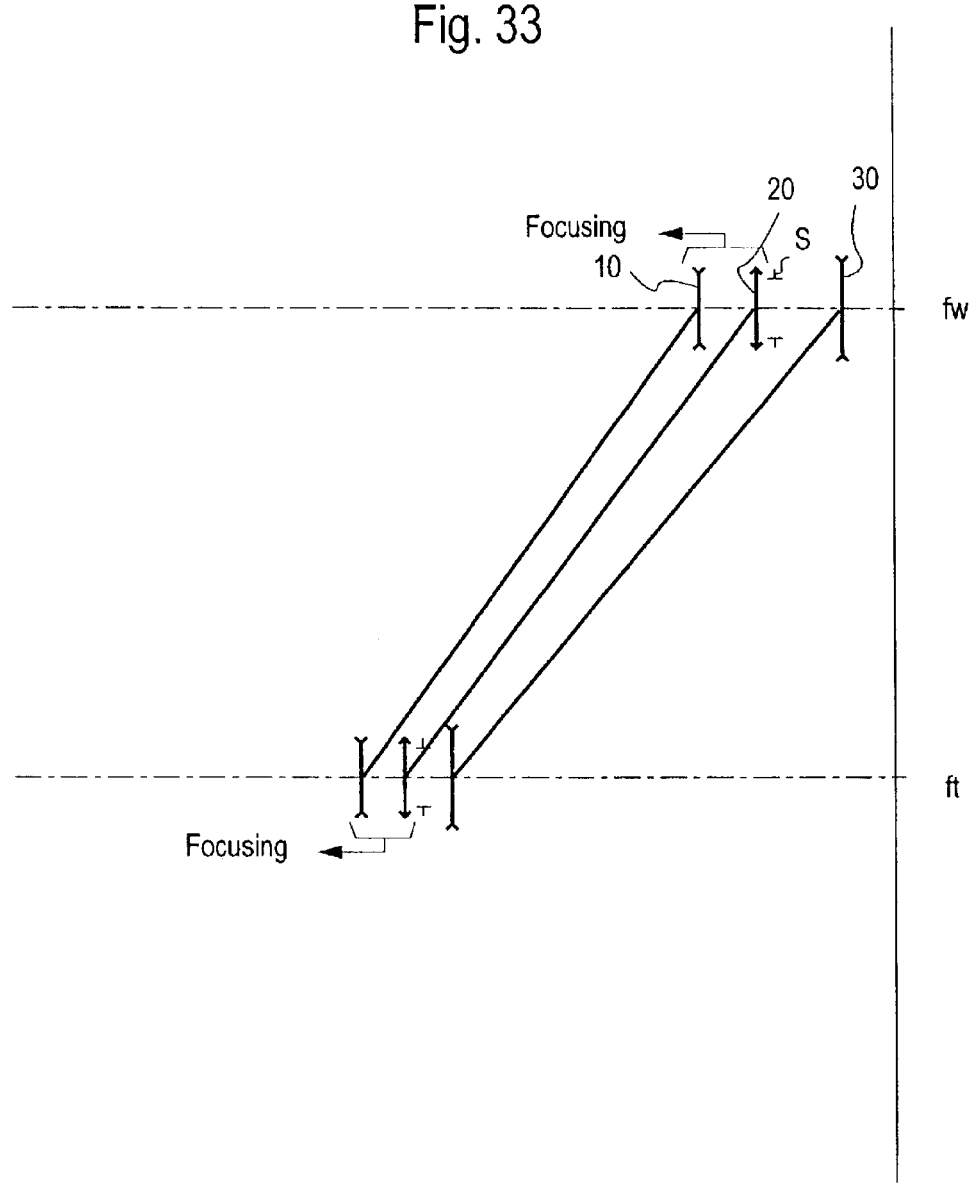

ZOOM LENS SYSTEM WHICH COVERS A WIDE ANGLE RANGE

BACKGROUND OF THE INVENTION

1. Field of the Invention

The present invention relates to a zoom lens system which is utilized in a photographic camera, especially a lens-shutter type camera with a wide angle range (e.g., a half angle-of-view of more than 40°) and a zoom ratio (magnification ratio) of more than 3.5.

2. Description of the Prior Art

A zoom lens system of a compact camera does not require a long back focal distance, unlike a zoom lens system of a single lens reflex (SLR) camera which requires a space to provide a mirror behind the photographing lens system. Therefore in a compact camera, a telephoto-type lens system, including a positive lens group and a negative lens group, in this order from the object, is generally used. On the other hand, in a single lens reflex camera, a retrofocus-type lens system, including a negative lens group and a positive lens group, in this order from the object, is generally used.

In such a telephoto-type lens system (the "positive-lead" lens system) in which the positive lens group is provided closer to the object than the negative lens group is, miniaturization of the lens system can be easily made; however, it is difficult to make the focal length shorter at the short focal length extremity, i.e., the difficulty in achieving a wide angle of view.

In order to overcome the above-described drawbacks, a zoom lens system of three-lens-group arrangement (a negative lens group, a positive lens group, and a negative lens group) has been proposed for the purpose of making the focal length at the short focal length extremity shorter in, e.g., Japanese Unexamined Patent Publication Nos. Hei-5-93865 and Hei-6-82697. According to such a "negative-lead" lens system, it is easy to make the focal length at the short focal length extremity shorter; however, it is difficult to achieve a high zoom ratio; and the frontmost lens diameter tends to become larger. Accordingly, if such a zoom lens system is employed in a telescoping-retractable zoom lens system having a plurality of lens barrels, the entire camera becomes large, since the frontmost lens diameter is, as explained, larger. Moreover, if an attempt is made to increase the zoom ratio thereof, the overall length of the zoom lens system at the long focal length extremity becomes longer.

SUMMARY OF THE INVENTION

The present invention provides a miniaturized and high zoom ratio zoom lens system achieving the following features:

(i) both a wide viewing angle and a high zoom ratio are achieved while the three-lens-group arrangement of the negative-positive-negative lens groups, in this order from the object, is employed;

(ii) at the long focal length extremity, the overall length of the zoom lens system is made shorter;

(iii) the frontmost lens diameter is made smaller; and (iv) adequate optical performance is obtained over the entire focal length range.

According to an aspect of the present invention, there is provided a zoom lens system, which covers a wide-angle range, including a negative powered (hereinafter, negative) first lens group, a positive powered (hereinafter, positive) second lens group, and a negative third lens group, in this order from the object. Zooming is performed by varying the distances between the first to third lens groups, and the zoom lens system satisfies the following conditions:

$$1.9 < |(fw*ft)^{1/2}/f1| < 2.9 \,(f1<0) \tag{1}$$

$$1.0 < f12t/f12w < 1.8 \tag{2}$$

wherein fw designates the focal length of the entire zoom lens system at the short focal length extremity;

ft designates the focal length of the entire zoom lens system at the long focal length extremity;

f1 designates the focal length of the negative first lens group;

f12w designates the combined focal length of the negative first lens group and the positive second lens group at the short focal length extremity; and f12t designates the combined focal length of the negative first lens group and the positive second lens group at the long focal length extremity.

The zoom lens system preferably satisfies the following conditions:

$$0.3 < LD_{12W}/fw < 0.8 \tag{3}$$

$$0.01 < \Delta/ft < 0.1 \tag{4}$$

wherein $LD_{12W}$ designates the distance, at the short focal length extremity, from the most object-side surface of the negative first lens group to the most image-side surface of the positive second lens group; and $\Delta$ designates the amount of change of the distance between the negative first lens group and the positive second lens group at the short focal length extremity and the long focal length extremity, respectively.

Focusing can be carried out by integrally moving the negative first lens group and the positive second lens group.

The zoom lens system preferably satisfies the following condition:

$$\omega > 40° \tag{5}$$

wherein $\omega$ designates the half angle-of-view with respect to an image height of 21.6 mm, at the short focal length extremity.

The zoom lens system can satisfies the following condition:

$$Z > 3.5 \tag{6}$$

wherein

Z=ft/fw.

The zoom lens system preferably satisfies the following condition:

$$N1G > 1.82 \tag{7}$$

wherein

N1G designates the maximum refractive index of the d-line of a negative lens element in the negative first lens group.

The present disclosure relates to subject matter contained in Japanese Patent Application No. 2002-118068 (filed on Apr. 19, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement, at the short focal length extremity, of the zoom lens system according to a first embodiment of the present invention;

FIGS. 2A, 2B, 2C and 2D show aberrations occurred in the lens arrangement shown in FIG. 1;

FIG. 3A, 3B, 3C and 3D show aberrations occurred in the zoom lens system of the first embodiment at a first intermediate focal length;

FIGS. 4A, 4B, 4C and 4D show aberrations occurred in the zoom lens system of the first embodiment at a second intermediate focal length;

FIG. 5 is a lens arrangement, at the long focal length extremity, of the zoom lens system according to the first embodiment of the present invention;

FIGS. 6A, 6B, 6C and 6D show aberrations occurred in the lens arrangement shown in FIG. 5;

FIG. 9A, 9B, 9C and 9D show aberrations occurred in the zoom lens system of the second embodiment at a first intermediate focal length;

FIGS. 10A, 10B, 10C and 10D show aberrations occurred in the zoom lens system of the second embodiment at a second intermediate focal length;

FIG. 11 is a lens arrangement, at the long focal length extremity, of the zoom lens system according to the second embodiment of the present invention;

FIGS. 12A, 12B, 12C and 12D show aberrations occurred in the lens arrangement shown in FIG. 11;

FIG. 15A, 15B, 15C and 15D show aberrations occurred in the zoom lens system of the third embodiment at a first intermediate focal length;

FIGS. 16A, 16B, 16C and 16D show aberrations occurred in the zoom lens system of the third embodiment at a second intermediate focal length;

FIG. 19 is a lens arrangement, at the short focal length extremity, of the zoom lens system according to a fourth embodiment of the present invention;

FIGS. 20A, 20B, 20C and 20D show aberrations occurred in the lens arrangement shown in FIG. 19;

FIGS. 27A, 27B, 27C and 27D show aberrations occurred in the zoom lens system of the fifth embodiment at a first intermediate focal length;

FIGS. 28A, 28B, 28C and 28D show aberrations occurred in the zoom lens system of the fifth embodiment at a second intermediate focal length;

FIG. 31 is the schematic view of the lens-group moving paths for the zoom lens system according to the present invention;

FIG. 32 is another schematic view of the lens-group moving paths for the zoom lens system according to the present invention; and FIG. 33 is the schematic view of the lens-group moving paths for the zoom lens system according to the present invention.

DESCRIPTION OF THE PREFERRED EMBODIMENTS

Figure 7:
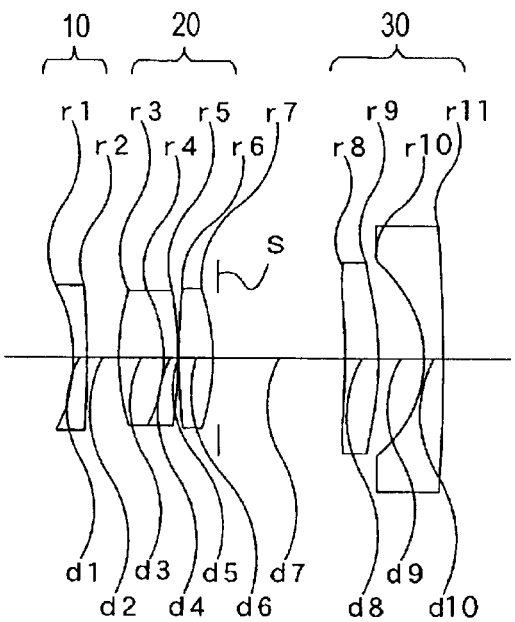
FIG. 7 is a lens arrangement, at the short focal length extremity, of the zoom lens system according to a second embodiment of the present invention.
Figure 8A:
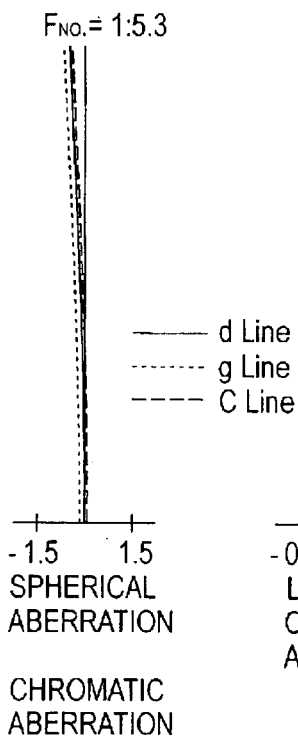
FIGS. 8A, 8B, 8C and 8D show aberrations occurred in the lens arrangement shown in FIG. 7.
Figure 8B:
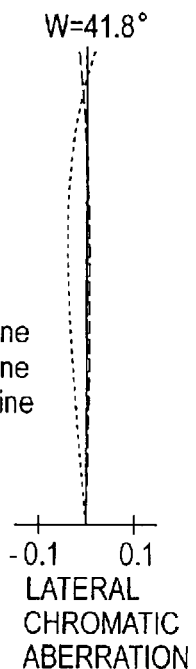
Figure 8C:
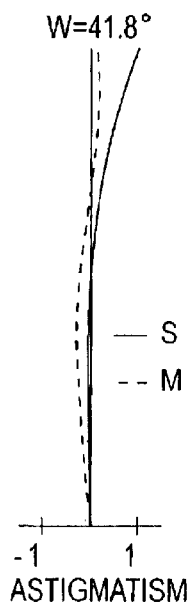
Figure 8D:

As shown in the lens-group moving paths of FIGS. 31 through 33, the three-lens-group zoom lens system for a compact camera includes a negative first lens group 10, a positive second lens group 20 and a negative third lens group 30, in this order from the object; and zooming is performed by moving the first through third lens group in the optical axis direction.

Among the schematic views of the lens-group moving paths of FIGS. 31 through 33, FIG. 31 is an example of the lens-group moving paths along which there is a switching movement of the lens groups at the intermediate focal lengths. According to FIG. 31, zooming from the short focal length extremity fw toward the long focal length extremity ft, the lens groups 10 through 30 are arranged to move as follows:

In a focal-length range Zw (the first focal length range; the short-focal-length side zooming range) from the short focal length extremity fw to the first intermediate focal length fm, the negative first lens group 10, the positive second lens group 20 and the negative third lens group 30 are moved toward the object.

At the first intermediate focal length fm (the before switching focal length), the negative first lens group 10, the positive second lens group 20 and the negative third lens group 30 are moved towards the image plane by a predetermined distance, so that the first intermediate focal length fm is changed to the second intermediate focal length fm' (the after switching focal length).

In a focal-length range Zt (the second focal length range; the long-focal-length side zooming range) from the second intermediate focal length fm' to the long focal length extremity ft, the negative first lens group 10, the positive second lens group 20 and the negative third lens group 30 are moved towards the object.

In the focal-length range Zw, the negative first lens group 10 and the positive second lens group 20 maintains a predetermined distance d1 (the first state).

At the first intermediate focal length fm, the distance d1 between the negative first lens group 10 and the positive second lens group 20 is reduced.

In the focal-length range Zt, the negative first lens group 10 and the positive second lens group 20 maintains the reduced distance d2 (the second state).

The first intermediate focal length fm belongs to the first focal length range; and the second intermediate focal length fm' is determined after the following movement of the lens groups is completed:

(i) the negative first lens group 10 and the negative third lens group 30 are moved from the positions thereof, corresponding to the first intermediate focal length fm, toward the image; and (ii) the negative first lens group 10 and the positive second lens group 20 reduce the distance therebetween.

Upon zooming, an aperture stop S moves together with the positive second lens group 20.

The lens-group-moving paths, before and after the switching movement, for the first through third lens groups 10, 20 and 30 shown in FIG. 31 are simply depicted as straight lines. It should however be noted that actual lens-group-moving paths are not necessarily straight lines. Furthermore, focusing is performed by integrally moving the negative first lens group 10 and the positive second lens group 20 regardless of the focal length ranges.

The lens-group-moving paths have discontinuities at the first intermediate focal length fm and the second intermediate focal length fm'; however, by adequately determining the positions of the negative first lens group 10, the positive second lens group 20 and the negative third lens group 30 respectively at the short focal length extremity fw, the first intermediate focal length fm, the second intermediate focal length fm' and the long focal length extremity ft, solutions by which an image is correctly formed on a predetermined plane can be obtained. According to the lens-group-moving paths with these solutions, a zoom lens system which is miniaturized and has a high zoom ratio can be obtained.

FIG. 32 shows that positions for stopping each lens group are determined in a stepwise manner along the lens-group-moving paths of FIG. 31; and positions at which each lens group is to be stopped are indicated with black dots, and the dots are connected by smooth curved lines. In an actual mechanical structure, each lens group can be moved along such smooth curved lines.

FIG. 33 shows an example of the lens-group moving paths which have no intermediate-switching focal length. Upon zooming from the short focal length extremity toward the long focal length extremity, all the lens groups move toward the object, while the distances therebetween are varied. The aperture stop S is provided between the positive second lens group 20 and the negative third lens group 30, and moves together with the positive second lens group 20.

Condition (1) specifies the negative refractive power of the first lens group 10 with respect to an intermediate focal length in the zooming range.

As explained, the zoom lens system employs the three-lens-group arrangement of the negative-positive-negative lens groups, in this order from the object. By increasing the negative refractive power of the first lens group 10 up to substantially the same refractive power of the negative third lens group 30, an approximately symmetrical refractive-power distribution is established, so that distortion and other optical characteristics can be adequately corrected.

If the negative refractive power of the first lens group 10 becomes stronger to the extent that $|(fw*ft)^{1/2}/f1|$ exceeds the lower limit of condition (1), a sufficient back focal distance can be secured at the short focal length extremity; however, the overall length of the zoom lens system at the long focal length extremity becomes longer.

If the negative refractive power of the first lens group 10 becomes weaker to the extent that $|(fw*ft)^{1/2}/f1|$ exceeds the upper limit of condition (1), the distance between the negative first lens group 10 and the positive second lens group 20 has to be made longer to secure a back focal distance at the short focal length extremity, so that the diameter of the negative first lens group 10 becomes larger.

Condition (2) specifies the ratio of the combined focal lengths of the negative first lens group 10 and the positive second lens group 20 at the short focal length extremity to the combined focal length thereof at the long focal length extremity.

If $f12t/f12w$ exceeds the lower limit of condition (2), the effect on the first and second lens groups 10 and 20 being movable is greatly reduced, so that it is difficult to achieve a wider angle-of-view and a higher zoom ratio.

If $f12t/f12w$ exceeds the upper limit of condition (2), the difference in the traveling distances of the negative first lens group 10 and the positive second lens group 20 upon zooming becomes greater, so that the diameter of the negative first lens group 10 becomes larger, and further miniaturization of the zoom lens system becomes difficult.

Condition (3) specifies the distance from the most object-side lens surface of the negative first lens group 10 to the most image-side lens surface of the positive second lens group 20, at the short focal length extremity.

If $LD_{12w}/fw$ exceeds the lower limit of condition (3), the distance between the negative first lens group 10 and the positive second lens group 20 becomes shorter. Consequently, the back focal distance at the short focal length extremity becomes extremely short.

If $LD_{12w}/fw$ exceeds the upper limit of condition (3), the entrance pupil position becomes distant from the negative first lens group 10 at the short focal length extremity. Consequently, the diameter of the negative first lens group 10 becomes larger, so that miniaturization in the radial direction of the zoom lens system becomes difficult.

Condition (4) specifies the amount of change in the distance between the negative first lens group 10 and the positive second lens group 20 at the short focal length extremity and the long focal length extremity, respectively.

If $\Delta/ft$ exceeds the lower limit of condition (4), the zooming effect obtained by the relative movement between the negative first lens group 10 and the positive second lens group 20 is decreased. As a result, it becomes difficult to achieve a high zoom ratio. If an attempt is made to achieve a higher zoom ratio, the traveling distance of each lens group becomes longer, so that the overall length of the zoom lens system is increased.

If $\Delta/ft$ exceeds the upper limit of condition (4),the distance between the negative first lens group 10 and the positive second lens group 20 becomes longer, and the diameter of the negative first lens group 10 becomes larger.

In order to attain a higher zoom ratio through a shorter relative traveling distance between the negative first lens group 10 and the positive second lens group 20, there is a need to strengthen the negative refractive power of the first lens group 10 and the positive refractive power of the second lens group 20, as shown in condition (1). Furthermore, for the purpose of reducing the occurrence of off-axis aberrations such as coma and astigmatism, the refractive index of the d-line of a negative lens element in the negative first lens group 10 preferably satisfies condition (7).

If N1G exceeds the lower limit of condition (7), the negative value of the Petzval sum becomes larger, so that off-axis optical performance deteriorates.

The positive second lens group 20 preferably includes at least two positive lens elements. Furthermore, by utilizing an aspherical lens surface on the most image-side surface of the positive second lens group 20, spherical aberration over the entire focal length range can be adequately corrected.

Focusing is preferably carried out by integrally moving the negative first lens group 10 and the positive second lens group 20 along the optical axis.

In order to further miniaturize the camera, it is desirable for the focusing lens group to be smaller, light-weight, and have a shorter traveling distance. On the other hand, it is possible to perform focusing by the negative first lens group 10 alone; however, in order to reduce the traveling distance of the focusing lens group, it is desirable to integrally move the negative first lens group 10 and the positive second lens group 20. Furthermore, according to such an integral movement of the first and second lens groups, deterioration of optical performance at close-distance photography can be reduced.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, Fno designates the f-number, f designates the focal length of the entire zoom lens system, W designates the half angle-of-view (°), fB designates the back focal distance, r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

FIG. 1 is the lens arrangement, at the short focal length extremity, of the zoom lens system according to the first embodiment. FIGS. 2A through 2D show aberrations occurred in the lens arrangement shown in FIG. 1. FIGS. 3A through 3D show aberrations occurred in the zoom lens system at a first intermediate focal length (fm=50.0; the before switching focal length) in the short-focal-length side zooming range Zw. FIGS. 4A through 4D show aberrations occurred in the zoom lens system at a second intermediate focal length (fm'=70.0; the after switching focal length) in the long-focal-length side zooming range Zt. FIG. 5 is the lens arrangement of the zoom lens system at the long focal length extremity. FIGS. 6A through 6D show aberrations occurred in the lens arrangement shown in FIG. 5. Table 1 shows the numerical data of the first embodiment.

Surface Nos. 1 through 3 designate the negative first lens group 10, surface Nos. 4 through 8 designate the positive second lens group 20, and surface Nos. 9 through 12 designate the negative third lens group 30.

The negative first lens group 10 includes cemented lens elements having a negative lens element and a positive lens element.

The positive second lens group 20 includes cemented lens elements having a positive lens element and a negative lens element, and a positive lens element, in this order from the object.

The negative third lens group 30 includes a positive lens element and a negative lens element, in this order from the object.

The diaphragm S is provided 0.40 mm behind the positive second lens group 20 (surface No. 8).

TABLE 1

$F_{NO.}$ = 1:4.8 - 8.6 - 11.3 - 13.0
f = 24.84 - 50.00 - 70.00 - 97.00
(Zoom Ratio = 3.90)
W = 42.0 - 24.0 - 17.1 - 12.6
fB = 8.00 - 35.22 - 48.17 - 74.03

| Surface No. | r | d | Nd | ν |
|---|---|---|---|---|
| 1 | −14.761 | 1.00 | 1.88300 | 40.8 |
| 2 | 15.210 | 3.20 | 1.75520 | 27.5 |
| 3 | −36.554 | 2.30—2.30-0.30—0.30 | — | — |
| 4 | 13.453 | 3.30 | 1.49700 | 81.6 |
| 5 | −13.453 | 1.00 | 1.84666 | 23.8 |
| 6 | −73.356 | 0.10 | — | — |
| 7 | 72.287 | 2.70 | 1.80440 | 39.6 |
| 8 | −17.466 | 11.07-4.30-4.40-2.90 | — | — |
| 9* | −46.466 | 2.64 | 1.80518 | 25.4 |
| 10* | −20.429 | 3.30 | — | — |
| 11 | −9.345 | 1.40 | 1.77250 | 49.6 |
| 12 | −276.303 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | 0.10068 × 10⁻³ | −0.12015 × 10⁻⁶ | 0.43187 × 10⁻⁸ |
| 9 | 0.00 | 0.71344 × 10⁻⁴ | 0.94889 × 10⁻⁶ | 0.41374 × 10⁻⁸ |
| 10 | 0.00 | −0.76954 × 10⁻⁶ | 0.14457 × 10⁻⁵ | −0.52533 × 10⁻⁸ |

Embodiment 2

FIG. 7 is the lens arrangement, at the short focal length extremity, of the zoom lens system according to the second embodiment. FIGS. 8A through 8D show aberrations occurred in the lens arrangement shown in FIG. 7. FIGS. 9A through 9D show aberrations occurred in the zoom lens system at a first intermediate focal length (fm=50.0; the before switching focal length) in the short-focal-length side zooming range Zw. FIGS. 10A through 10D show aberrations occurred in the zoom lens system at a second intermediate focal length (fm'=70.0; the after switching focal length) in the long-focal-length side zooming range zt. FIG. 11 is the lens arrangement of the zoom lens system at the long focal length extremity. FIGS. 12A through 12D show aberrations occurred in the lens arrangement shown in FIG. 11. Table 2 shows the numerical data of the second embodiment.

Surface Nos. 1 through 2 designate the negative first lens group 10, surface Nos. 3 through 7 designate the positive second lens group 20, and surface Nos. 8 through 11 designate the negative third lens group 30.

The basic lens arrangement of the second embodiment is the same as the first embodiment except that the negative first lens group 10 includes the negative single lens element. The diaphragm S is provided 0.40 mm behind the second lens group 20 (surface No. 7).

TABLE 2

$F_{NO.}$ = 1:5.3 - 8.1 - 10.5 - 11.8
f = 24.84 - 50.00 - 70.00 - 97.00
(Zoom Ratio = 3.90)
W = 41.8 - 23.9 - 17.0 - 12.5
fB = 8.00 - 34.84 - 44.92 - 69.38

| Surface No. | r | d | Nd | ν |
|---|---|---|---|---|
| 1 | −11.902 | 1.00 | 1.72916 | 54.7 |
| 2 | −80.558 | 2.30—2.30-0.30—0.30 | — | — |
| 3 | 17.730 | 3.30 | 1.58144 | 40.7 |
| 4 | −10.462 | 1.00 | 1.84666 | 23.9 |
| 5 | −34.053 | 0.10 | — | — |
| 6 | 52.116 | 2.50 | 1.69350 | 53.2 |
| 7* | −14.943 | 9.77-3.36-4.24-2.76 | — | — |
| 8* | −42.648 | 2.50 | 1.80518 | 25.4 |
| 9* | −21.025 | 3.27 | — | — |
| 10 | −9.200 | 1.40 | 1.77250 | 49.6 |
| 11 | −136.558 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 7 | 0.00 | $0.10648 \times 10^{-3}$ | $0.82580 \times 10^{-6}$ | $0.90010 \times 10^{-8}$ |
| 8 | 0.00 | $0.65203 \times 10^{-4}$ | $0.30381 \times 10^{-5}$ | $-0.13148 \times 10^{-7}$ |
| 9 | 0.00 | $0.95206 \times 10^{-5}$ | $0.24029 \times 10^{-5}$ | $-0.50160 \times 10^{-8}$ |

Embodiment 3

Figure 13:
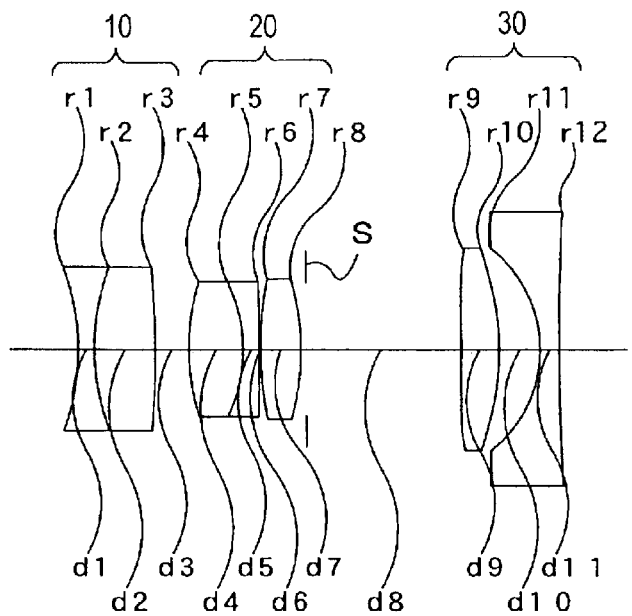
FIG. 13 is a lens arrangement, at the short focal length extremity, of the zoom lens system according to a third embodiment of the present invention.
Figure 14A:
FIGS. 14A, 14B, 14C and 14D show aberrations occurred in the lens arrangement shown in FIG. 13.
Figure 14B:
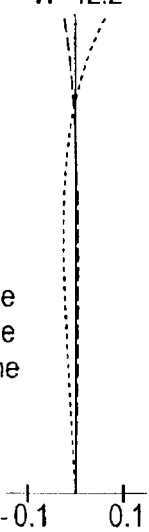
Figure 14C:
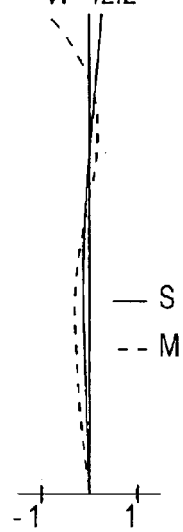
Figure 14D:
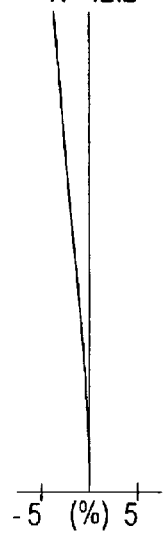
Figure 17:
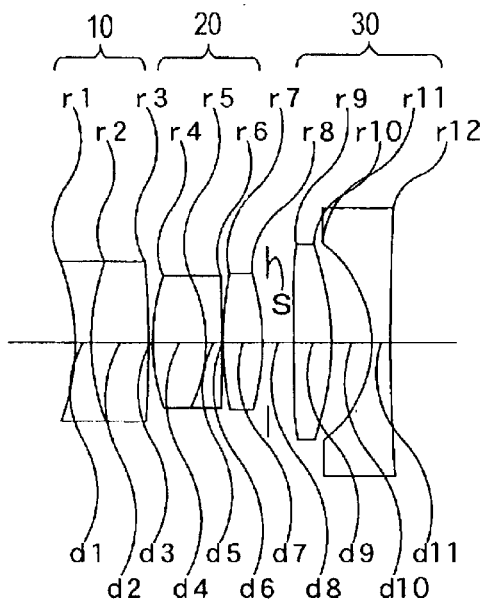
FIG. 17 is a lens arrangement, at the long focal length extremity, of the zoom lens system according to the third embodiment of the present invention.
Figure 18A:
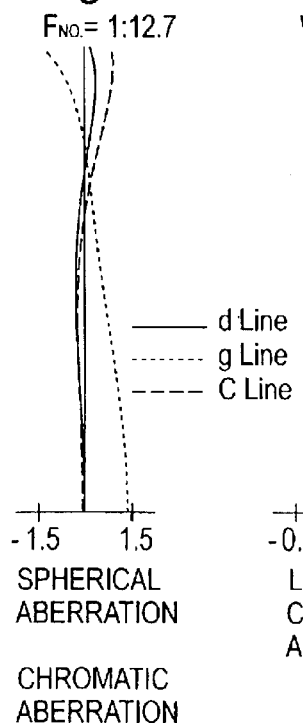
FIGS. 18A, 18B, 18C and 18D show aberrations occurred in the lens arrangement shown in FIG. 17.
Figure 18B:
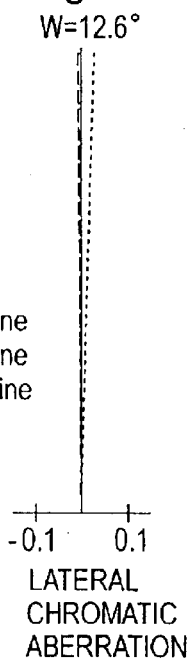
Figure 18C:
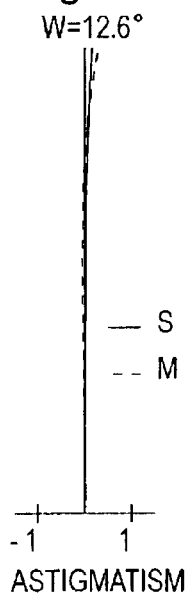
Figure 18D:
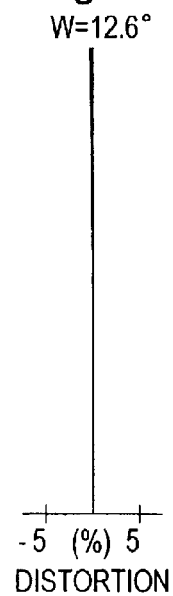
Figure 21A:
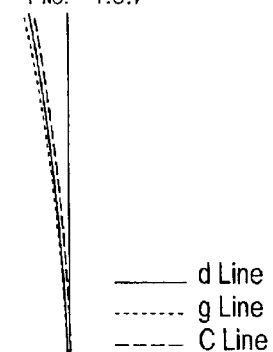
FIGS. 21A, 21B, 21C and 21D show aberrations occurred in the zoom lens system of the fourth embodiment at a first intermediate focal length.
Figure 21B:
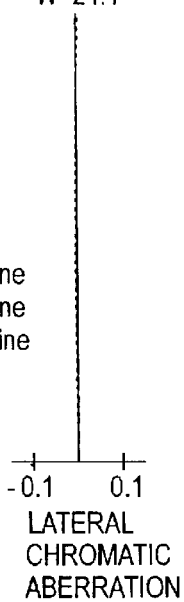
Figure 21C:
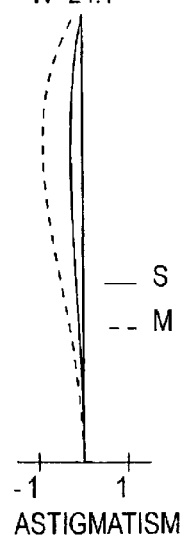
Figure 21D:
Figure 22A:
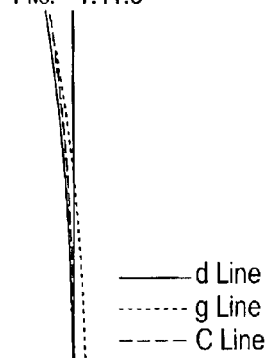
FIGS. 22A, 22B, 22C and 22D show aberrations occurred in the zoom lens system of the fourth embodiment at a second intermediate focal length.
Figure 22B:
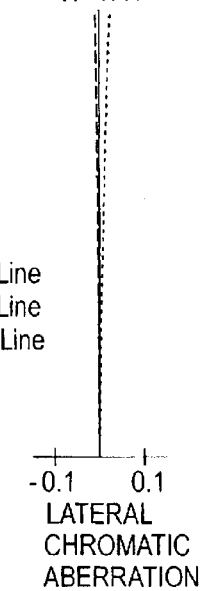
Figure 22C:
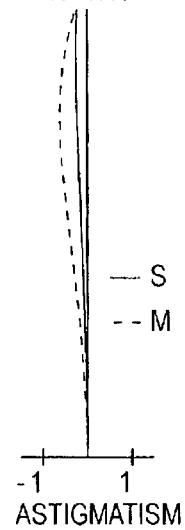
Figure 22D:
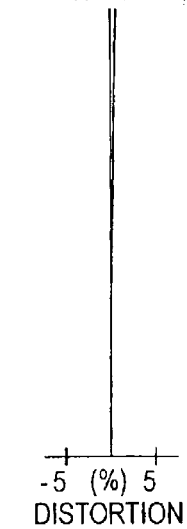

FIG. 13 is the lens arrangement, at the short focal length extremity, of the zoom lens system according to the third embodiment. FIGS. 14A through 14D show aberrations occurred in the lens arrangement shown in FIG. 13. FIGS. 15A through 15D show aberrations occurred in the zoom lens system at a first intermediate focal length (fm=50.0; the before switching focal length) in the short-focal-length side zooming range Zw. FIGS. 16A through 16D show aberrations occurred in the zoom lens system at a second intermediate focal length (fm'=70.0; the after switching focal length) in the long-focal-length side zooming range Zt. FIG. 17 is the lens arrangement of the zoom lens system at the long focal length extremity. FIGS. 18A through 18D show aberrations occurred in the lens arrangement shown in FIG. 17. Table 3 shows the numerical data of the third embodiment.

Surface Nos. 1 through 3 designate the negative first lens group 10, surface Nos. 4 through 8 designate the positive second lens group 20, and surface Nos. 9 through 12 designate the negative third lens group 30. The basic lens arrangement of the third embodiment is the same as the first embodiment. The diaphragm S is provided 0.40 mm behind the second lens group 20 (surface No. 8).

TABLE 3

$F_{NO.}$ = 1:5.4 - 8.9 - 11.7 - 12.7
f = 24.83 - 50.00 - 70.00 - 97.00
(Zoom Ratio = 3.90)
W = 42.2 - 24.2 - 17.2 - 12.6
fB = 8.50 - 37.23 - 50.64 - 77.83

| Surface No. | r | d | Nd | ν |
|---|---|---|---|---|
| 1 | −17.416 | 1.20 | 1.88300 | 40.8 |
| 2 | 17.416 | 4.40 | 1.80518 | 25.4 |
| 3 | −77.000 | 2.50—2.50-0.30—0.30 | — | — |
| 4 | 16.331 | 4.00 | 1.48749 | 70.2 |
| 5 | −11.050 | 1.20 | 1.80518 | 25.4 |
| 6 | −251.725 | 0.10 | — | — |
| 7 | 26.653 | 2.94 | 1.72752 | 0.3 |
| 8* | −16.897 | 11.61-4.00-4.09-2.40 | — | — |
| 9* | −207.724 | 2.80 | 1.58547 | 29.9 |
| 10* | −19.532 | 3.01 | — | — |
| 11 | −9.400 | 1.40 | 1.72916 | 54.7 |
| 12 | −173.952 | — | — | — |

*designates the aspherical surface which is rotationally symmetrical with respect to the optical axis.

Aspherical surface data (the aspherical surface coefficients not indicated are zero (0.00)): are zero (0.00)):

| Surf. No. | K | A4 | A6 | A8 |
|---|---|---|---|---|
| 8 | 0.00 | $0.10400 \times 10^{-3}$ | $-0.12000 \times 10^{-6}$ | 0.00 |
| 9 | 0.00 | $0.89500 \times 10^{-4}$ | $0.26400 \times 10^{-6}$ | $0.12100 \times 10^{-7}$ |
| 10 | 0.00 | 0.00 | $0.99000 \times 10^{-6}$ | 0.00 |

Embodiment 4

Figure 23:
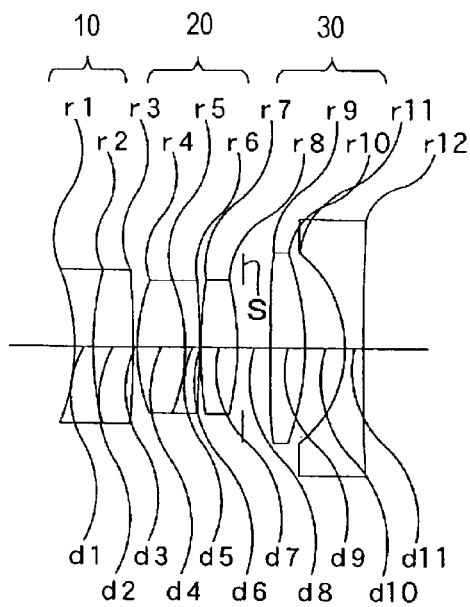
FIG. 23 is a lens arrangement, at the long focal length extremity, of the zoom lens system according to the fourth embodiment of the present invention.
Figure 24A:
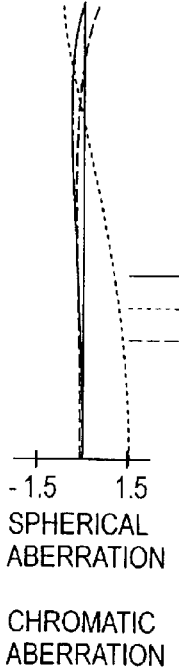
FIGS. 24A, 24B, 24C and 24D show aberrations occurred in the lens arrangement shown in FIG. 23.
Figure 24B:
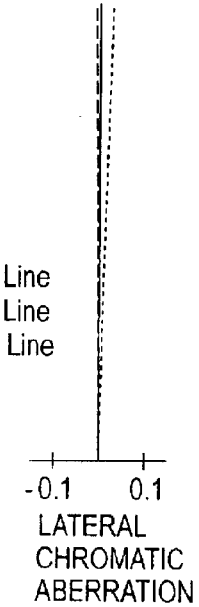
Figure 24C:
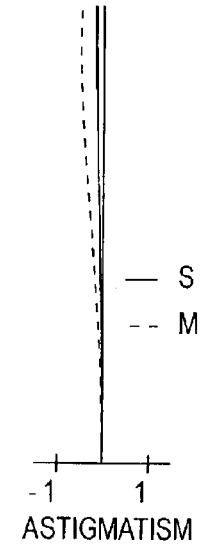
Figure 24D:
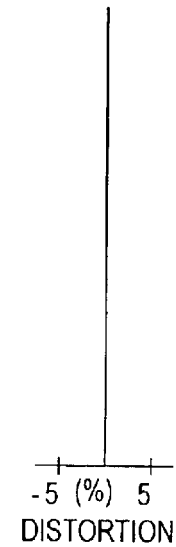

FIG. 19 is the lens arrangement, at the short focal length extremity, of the zoom lens system according to the fourth embodiment. FIGS. 20A through 20D show aberrations occurred in the lens arrangement shown in FIG. 19. FIGS. 21A through 21D show aberrations occurred in the zoom lens system at a first intermediate focal length (fm=50.0; the before switching focal length) in the short-focal-length side zooming range Zw. FIGS. 22A through 22D show aberrations occurred in the zoom lens system at a second intermediate focal length (fm'=70.0; the after switching focal length) in the long-focal-length side zooming range Zt. FIG. 23 is the lens arrangement of the zoom lens system at the long focal length extremity. FIGS. 24A through 24D show aberrations occurred in the lens arrangement shown in FIG. 23. Table 4 shows the numerical data of the fourth embodiment.

Surface Nos. 1 through 3 designate the negative first lens group 10, surface Nos. 4 through 8 designate the positive second lens group 20, and surface Nos. 9 through 12 designate the negative third lens group 30. The basic lens arrangement of the fourth embodiment is the same as the first embodiment. The diaphragm S is provided 0.40 mm behind the second lens group 20 (surface No. 8).

TABLE 4

$F_{NO.}$ = 1:5.0 - 8.7 - 11.3 - 13.5
f = 24.84 - 50.00 - 70.00 - 106.70
(Zoom Ratio = 4.30)
W = 41.8 - 24.1 - 17.1 - 11.5
fB = 8.50 - 36.35 - 46.97 - 81.55

| Surface No. | r | d | Nd | ν |
|---|---|---|---|---|
| 1 | −15.829 | 1.40 | 1.88300 | 40.8 |
| 2 | 22.985 | 3.10 | 1.78472 | 25.7 |
| 3 | −70.081 | 2.70—2.70-0.30—0.30 | — | — |
| 4 | 13.854 | 3.66 | 1.48749 | 70.2 |
| 5 | −13.854 | 1.10 | 1.84666 | 23.8 |
| 6 | −75.178 | 0.10 | — | — |
| 7 | 33.257 | 2.82 | 1.72752 | 40.3 |
| 8* | −19.476 | 10.90-3.67-4.56-2.50 | — | — |
| 9* | −393.927 | 2.66 | 1.58547 | 29.9 |
| 10* | −20.020 | 3.03 | — | — |
| 11 | −9.428 | 1.40 | 1.77250 | 49.6 |
| 12 | 253.774 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $0.11393 \times 10^{-3}$ | $-0.26409 \times 10^{-6}$ | $0.32823 \times 10^{-8}$ |
| 9 | 0.00 | $0.73887 \times 10^{-4}$ | $0.63800 \times 10^{-6}$ | $0.33953 \times 10^{-8}$ |
| 10 | 0.00 | $-0.21592 \times 10^{-4}$ | $0.17608 \times 10^{-5}$ | $-0.14779 \times 10^{-7}$ |

Embodiment 5

Figure 25:
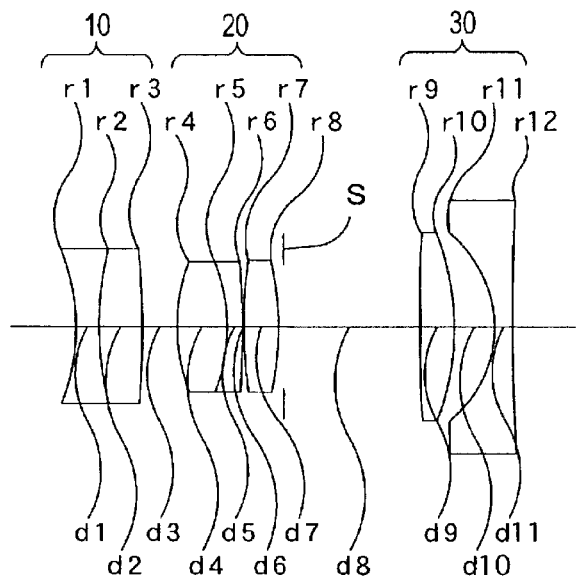
FIG. 25 is a lens arrangement, at the short focal length extremity, of the zoom lens system according to a fifth embodiment of the present invention.
Figure 26A:
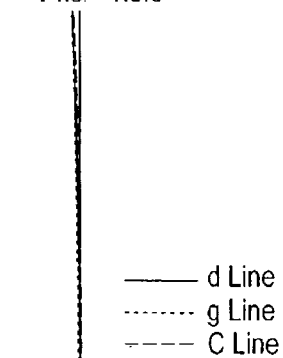
FIGS. 26A, 26B, 26C and 26D show aberrations occurred in the lens arrangement shown in FIG. 25.
Figure 26B:
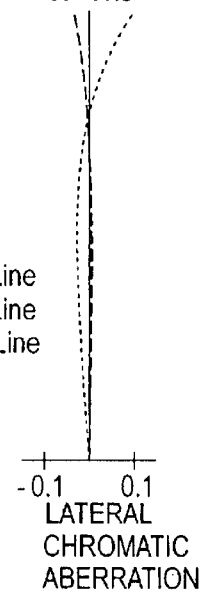
Figure 26C:
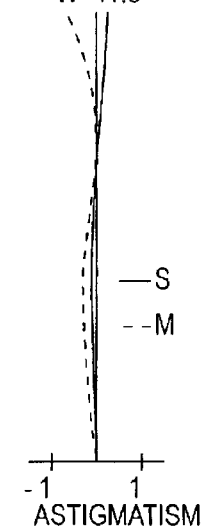
Figure 26D:
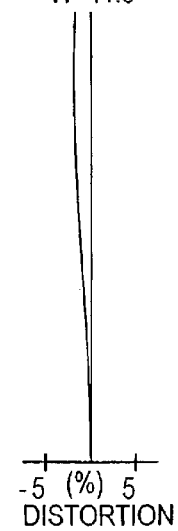
Figure 29:
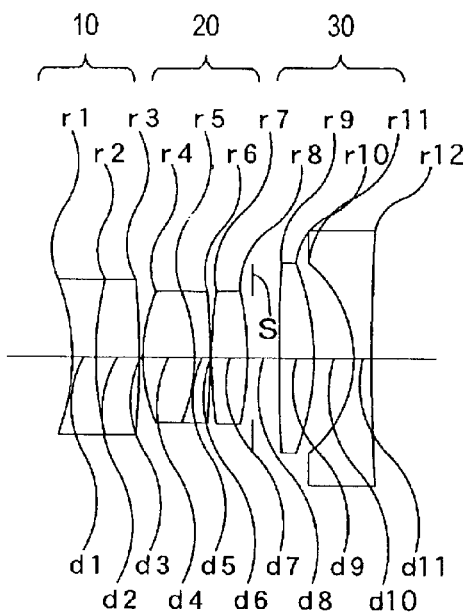
FIG. 29 is a lens arrangement, at the long focal length extremity, of the zoom lens system according to the fifth embodiment of the present invention.
Figure 30A:
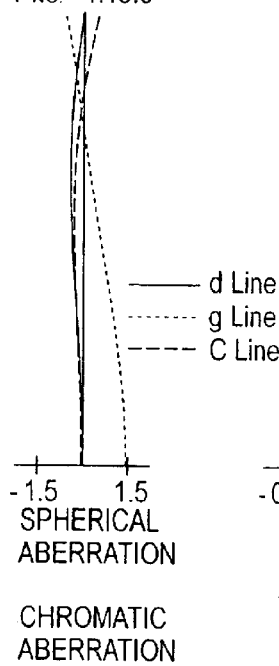
FIGS. 30A, 30B, 30C and 30D show aberrations occurred in the lens arrangement shown in FIG. 29.
Figure 30B:
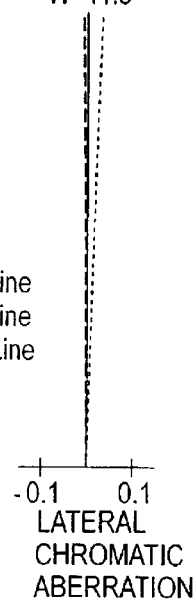
Figure 30C:
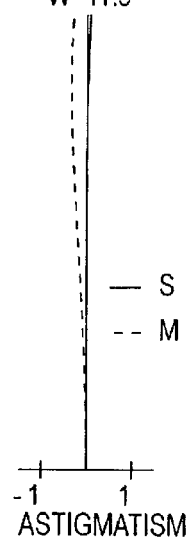
Figure 30D:
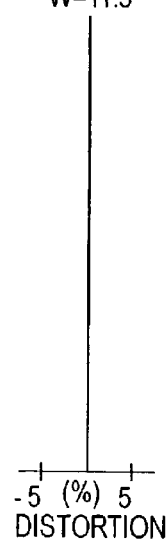

FIG. 25 is the lens arrangement, at the short focal length extremity, of the zoom lens system according to the fifth embodiment. FIGS. 26A through 26D show aberrations occurred in the lens arrangement shown in FIG. 25. FIGS. 27A through 27D show aberrations occurred in the zoom lens system at a first intermediate focal length (fm=50.0; the before switching focal length) in the short-focal-length side zooming range Zw. FIGS. 28A through 28D show aberrations occurred in the zoom lens system at a second intermediate focal length (fm'=70.0; the after switching focal length) in the long-focal-length side zooming range Zt. FIG. 29 is the lens arrangement of the zoom lens system at the long focal length extremity. FIGS. 30A through 30D show aberrations occurred in the lens arrangement shown in FIG. 29. Table 5 shows the numerical data of the fifth embodiment.

Surface Nos. 1 through 3 designate the negative first lens group 10, surface Nos. 4 through 8 designate the positive second lens group 20, and surface Nos. 9 through 12 designate the negative third lens group 30. The basic lens arrangement of the fifth embodiment is the same as the first embodiment. The diaphragm S is provided 0.40 mm behind the second lens group 20 (surface No. 8).

TABLE 5

$F_{NO.}$ = 1:5.0 - 8.7 - 11.4 - 13.6
f = 24.84 - 50.00 - 70.00 - 106.70
(Zoom Ratio = 4.30)
W = 41.5 - 24.0 - 17.1 - 11.5
fB = 8.40 - 35.72 - 46.71 - 80.94

| Surface No. | r | d | Nd | ν |
|---|---|---|---|---|
| 1 | −16.202 | 1.80 | 1.88300 | 40.8 |
| 2 | 24.230 | 3.32 | 1.78472 | 25.7 |
| 3 | −71.200 | 2.70—2.70-0.30—0.30 | — | — |
| 4 | 13.800 | 3.90 | 1.48749 | 70.2 |
| 5 | −13.800 | 1.20 | 1.84666 | 23.8 |
| 6 | −65.000 | 0.10 | — | — |
| 7 | 34.336 | 2.78 | 1.72752 | 40.3 |
| 8* | −20.966 | 10.88-3.78-4.50-2.50 | — | — |
| 9* | −724.931 | 2.66 | 1.58547 | 29.9 |
| 10* | −20.439 | 3.11 | — | — |
| 11 | −9.400 | 1.40 | 1.77250 | 49.6 |
| 12 | 185.512 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $0.10540 \times 10^{-3}$ | $-0.29520 \times 10^{-6}$ | $0.35420 \times 10^{-8}$ |
| 9 | 0.00 | $0.73060 \times 10^{-4}$ | $-0.52850 \times 10^{-7}$ | $0.41360 \times 10^{-8}$ |
| 10 | 0.00 | $-0.23370 \times 10^{-4}$ | $0.10640 \times 10^{-5}$ | $-0.16190 \times 10^{-7}$ |

Table 6 shows the numerical values of each condition for each embodiment.

TABLE 6

| | Embod. 1 | Embod. 2 | Embod. 3 | Embod. 4 | Embod. 5 |
|---|---|---|---|---|---|
| Cond.(1) | 2.187 | 2.547 | 2.116 | 2.440 | 2.366 |
| Cond.(2) | 1.130 | 1.177 | 1.134 | 1.175 | 1.164 |
| Cond.(3) | 0.548 | 0.411 | 0.658 | 0.599 | 0.636 |
| Cond.(4) | 0.021 | 0.021 | 0.023 | 0.022 | 0.022 |
| Cond.(5) | 42.0 | 41.8 | 42.2 | 41.8 | 41.5 |
| Cond.(6) | 3.90 | 3.90 | 3.90 | 4.30 | 4.30 |
| Cond.(7) | 1.88300 | 1.72916 | 1.88300 | 1.88300 | 1.88300 |

As can be understood from Table 6, the first, and third through fifth embodiments satisfy conditions (1) through (7). On the other hand, the second embodiment satisfies condition (1) through (6). Furthermore, as can be understood from the aberration diagrams, the various aberrations are relatively well corrected.

Each of the first through fifth embodiments are applied to a zoom lens system having either the zoom path shown in FIG. 31 or in FIG. 32; however, the present invention can also be applied to a zoom lens system having a zoom path shown in FIG. 33 which does not have an intermediate focal length switching position.

According to the above description, a zoom lens system achieving the following features can be obtained:
(i) both a wide viewing angle and a high zoom ratio are achieved while the three-lens-group arrangement of the negative-positive-negative lens groups, in this order from the object, is employed;
(ii) at the long focal length extremity, the overall length of the zoom lens system is made shorter;

(iii) the frontmost lens diameter is made smaller; and (iv) adequate optical performance is obtained over the entire focal length range.

What is claimed is:

1. A zoom lens system, covering a wide-angle range, comprising a negative first lens group, a positive second lens group, and a negative third lens group, in this order from an object, wherein zooming is performed by varying the distances between said first to third lens groups; and wherein said zoom lens system satisfies the following conditions:

$1.9 < |(fw*ft)^{1/2}/f1| < 2.9 (f1<0)$ $1.0 < f12t/f12w < 1.8$ wherein fw designates the focal length of the entire zoom lens system at the short focal length extremity;

ft designates the focal length of the entire zoom lens system at the long focal length extremity;

f1 designates the focal length of said negative first lens group;

f12w designates the combined focal length of said negative first lens group and said positive second lens group at the short focal length extremity; and f12t designates the combined focal length of said negative first lens group and said positive second lens group at the long focal length extremity.

2. The zoom lens system covering a wide-angle range according to claim 1, satisfying the following conditions:

$0.3 < LD_{12W}/fw < 0.8$ $0.01 < \Delta/ft < 0.1$ wherein $LD_{12W}$ designates the distance, at the short focal length extremity, from the most object-side surface of said negative first lens group to the most image-side surface of said positive second lens group; and $\Delta$ designates the amount of change of the distance between said negative first lens group and said positive second lens group at the short focal length extremity and the long focal length extremity, respectively.

3. The zoom lens system covering a wide-angle range according to claim 1, wherein said zoom lens system performs focusing by integrally moving said negative first lens group and said positive second lens group.

4. The zoom lens system covering a wide-angle range according to claim 1, satisfying the following condition:

$\omega > 40°$ wherein $\omega$ designates the half angle-of-view with respect to an image height of 21.6 mm, at the short focal length extremity.

5. The zoom lens system covering a wide-angle range according to claim 1, satisfying the following condition:

$Z > 3.5$ wherein $Z = ft/fw$.

6. The zoom lens system covering a wide-angle range according to claim 1, satisfying the following condition:

$N1G > 1.82$ wherein

N1G designates the maximum refractive index of the d-line of a negative lens element in said negative first lens group.

* * * * *